US010408366B2

(12) United States Patent
Le Louëdec et al.

(10) Patent No.: US 10,408,366 B2
(45) Date of Patent: Sep. 10, 2019

(54) METHOD FOR FIXING A TUBE TO A CONNECTOR, AND CONNECTING KIT

(71) Applicant: SNECMA, Paris (FR)

(72) Inventors: Dominique Le Louëdec, Saint Marcel (FR); Carine Dorion, Aubevoye (FR); Bruno Bucher, Pont de l'Arche (FR); Frederick Millon, Saint Marcel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 355 days.

(21) Appl. No.: 15/039,726

(22) PCT Filed: Nov. 17, 2014

(86) PCT No.: PCT/FR2014/052932
§ 371 (c)(1),
(2) Date: May 26, 2016

(87) PCT Pub. No.: WO2015/079141
PCT Pub. Date: Jun. 4, 2015

(65) Prior Publication Data
US 2016/0377201 A1 Dec. 29, 2016

(30) Foreign Application Priority Data
Nov. 27, 2013 (FR) ...................... 13 61704

(51) Int. Cl.
F16L 5/02 (2006.01)
F02K 9/42 (2006.01)
(Continued)

(52) U.S. Cl.
CPC ............... F16L 5/022 (2013.01); F02K 9/42 (2013.01); F02K 9/60 (2013.01); F28D 7/024 (2013.01); F05D 2230/232 (2013.01)

(58) Field of Classification Search
CPC .... F16L 5/022; F02K 9/42; F02K 9/60; F28D 7/024; F05D 2230/232
See application file for complete search history.

(56) References Cited

U.S. PATENT DOCUMENTS 1,392,204 A  9/1921 Nichols
1,896,216 A  2/1933 Brandt

FOREIGN PATENT DOCUMENTS

FR  2257841 A1  8/1975
FR  2500572 A1  8/1982
(Continued)

OTHER PUBLICATIONS

International Search Report in corresponding International Application No. PCT/FR2014/052932 dated Mar. 10, 2015 (5 pages—English Translation included).
(Continued)

Primary Examiner — John C Hong
(74) Attorney, Agent, or Firm — Bookoff McAndrews, PLLC

(57) ABSTRACT

A fastening method for fastening a tube (50) to a connector (101, 102), the method comprising the following steps: a) providing a connection kit comprising a sleeve, and a coupling for connecting together at least one pair of tubes, of generally tubular shape; b) placing the coupling in a first position in which the first end of the coupling projects outside the sleeve through a first end (10A) thereof; c) then fastening the first tube in leaktight manner to the first orifice; d) moving the coupling relative to the sleeve into a second position in which the first orifice lies inside the sleeve; and e) with the coupling in the second position, fastening the sleeve (10) at a sufficient distance from the coupling (20). A connection kit for performing the method.

14 Claims, 2 Drawing Sheets

(51) Int. Cl.
*F28D 7/02* (2006.01)
*F02K 9/60* (2006.01)

(56) References Cited

FOREIGN PATENT DOCUMENTS

| | | |
|---|---|---|
| FR | 2928436 A1 | 9/2009 |
| JP | H04-004299 U | 1/1992 |

OTHER PUBLICATIONS

English translation of Office Action dated Aug. 21, 2018, in corresponding Japanese Application No. JP2016-534988 (3 pages).

METHOD FOR FIXING A TUBE TO A CONNECTOR, AND CONNECTING KIT

CROSS-REFERENCE TO RELATED APPLICATIONS

This application is the U.S. national phase entry under 35 U.S.C. § 371 of International Application No. PCT/FR2014/052932, filed on Nov. 17, 2014, which claims priority to French Patent Application No. 1361704, filed on Nov. 27, 2013.

The invention relates to fastening a tube to a coupling for connecting together at least one pair of tubes, in the event that the end of the tube needs to pass inside a sleeve in order to reach the coupling. The term "a coupling for connecting together at least one pair of tubes" is used herein to mean equipment having an internal passage, possibly a very short passage, which passage opens out in two walls of the equipment via two connection orifices to which tubes can be connected. A "sleeve" means a part presenting at least one through internal passage that is suitable for receiving an inside part that is of elongate shape. A preferred sleeve shape is generally that of a body of revolution about an internal passage.

Although the above-mentioned sleeve may have any function (or need not have any technical function), and in particular a function of providing mechanical protection for the connection of the tube to the coupling, the invention relates more particularly to the situation in which the sleeve is a support sleeve serving to fasten the coupling on a structure relative to which the junction between the two tubes needs to be held in a fixed position, the structure possibly being a partition through which the tube passes, for example.

In known manner (see for example French patent No. 2 928 436), in order to enable the tube to be fastened, the coupling for connecting together at least one pair of tubes is formed integrally with the sleeve. The resulting single part has a flange with an internal passage passing therethrough, and that performs the function of connecting together the two tubes, together with a portion in the form of a sleeve, referred to for simplicity as "the sleeve", that extends from a periphery of the flange and that enables the flange to be fastened on a wall to which the coupling is to be fastened.

The fastening of the tube that passes through the sleeve (referred to below as the "first tube") is performed by tube expansion: the first tube is inserted into the sleeve and caused to pass through the internal passage of the coupling, such that the end of the tube is accessible from the end of the coupling remote from the first tube. The end of the tube is then deformed plastically so that this end is blocked in leaktight manner in a groove provided for this purpose in the coupling.

Nevertheless, fastening in that way makes it necessary to use a sleeve of length that does not exceed the length of the portion of the first tube that can be placed inside the sleeve, since the tube needs to extend through the sleeve practically until it reaches the remote end of the internal passage of the coupling in order to enable the tube expansion operation to be performed.

Unfortunately, in certain configurations, the length of the portion of tube that can be placed in the sleeve is short, and consequently the length of the sleeve is likewise short. In such situations, that can be incompatible with the specifications applicable to the sleeve.

Such a situation arises in particular at least in the rocket engine heat exchanger of the type disclosed in the above-mentioned patent.

That heat exchanger is constituted mainly by a pipe wound to form helical turns and referred to as a "coil" that is arranged inside a cylindrical tube. Passing a flow of hydrogen in the coil enables the temperature of the hydrogen to be raised and enables the hydrogen to be vaporized.

The ends of the coil need to be in fixed positions relative to the wall of the cylindrical tube, and they need to be connected to respective upstream and downstream second tubes for the purposes of delivering and discharging hydrogen.

In the heat exchanger, the coil is subjected to considerable amounts of thermal expansion as a result of the very large temperature variations to which it is subjected. The ends of the coil therefore need to be fastened and held in such a manner as to withstand the forces induced by such thermal expansions and contractions, and/or in order to accompany them.

In order to avoid excessive stresses arising at the ends of the coil, instead of holding the ends of the coil stationary regardless of temperature, the Applicant has developed the support connector described in the above-mentioned patent. In that connector, the sleeve-forming portion presents a certain amount of resilience, thereby accommodating a limited amount of movement of the ends of the coil and thus limiting the stresses to which those ends are subjected.

The connector is arranged in such a manner that a first end of the sleeve is fastened to the wall of the cylindrical tube of the heat exchanger, while the other end of the sleeve is fastened to the connector portion in the form of a flange.

Nevertheless, because of the position of the coil (which constitutes the "first tube") inside the heat exchanger, the length of coil that can be made to project outside the cylindrical tube by passing through its partition in order to enable the coil to be connected upstream and downstream is itself very short, and in particular no more than a few centimeters.

Consequently, in the connector described in the above-mentioned patent, the sleeve-shaped portion can only be very short in length. As a result, the sleeve-shaped portion presents only limited capacity for resilient damping, which may be insufficient in certain applications.

There therefore exists the need for a connector and a fastening method for connecting a first tube to a coupling in order to connect together at least one pair of tubes, wherein the end of the first tube passes inside a sleeve but that does not require the length of the sleeve to be limited to the length of the portion of the first tube that can be made available inside the sleeve in order to be fastened therein to the coupling.

An object of the invention is thus to define a connector and a fastening method for connecting a first tube to a coupling in order to connect together at least one pair of tubes, that enables a very reliable fastening to be provided, and that is of quality that can be verified by inspection performed after the fastening operation.

The invention seeks to satisfy this need and this object by proposing an assembly comprising a tube and a connector, a connection kit, and a fastening method enabling a tube to be fastened to a coupling in order to connect together at least one pair of tubes.

A first aspect of the invention thus consists in a method of fastening a first tube to a connector, the connector enabling a second tube to be connected to the first tube, the method comprising the following steps:

a) providing a connection kit comprising a sleeve and a coupling for connecting together at least one pair of tubes;

the coupling, of generally tubular shape, presenting an axis, together with first and second orifices for fastening the two tubes;

the first orifice being arranged at a first end of the coupling and being oriented on its axis;

b) placing the coupling in a first position in which the first end of the coupling projects outside the sleeve through a first end thereof;

c) then fastening the tube in leaktight manner to the first orifice of the coupling;

d) moving the coupling relative to the sleeve into a second position in which the first orifice preferably lies inside the sleeve; and e) with the coupling in the second position, fastening the sleeve to the coupling at a distance from said first orifice, said distance being greater than a diameter of an internal passage of the coupling, the sleeve and the coupling then together constituting the connector.

In the above definition, a "generally tubular shape" means the shape of an article presenting an internal passage of length that is greater than its diameter.

In the fastening method as defined in this way, the coupling and the sleeve are distinct parts. More precisely, they are two distinct parts that are provided in step a), which parts are subsequently fastened together during step e) of the fastening method, e.g. by welding. The sleeve and the coupling are therefore not two portions of a single integrally-formed part.

The sleeve and the coupling may nevertheless possibly already be partially fastened together as from step a), insofar as such partial fastening does not prevent the relative positioning specified in steps b) and d).

The coupling is a coupling for connecting together at least one pair of tubes. For this purpose, it presents an internal passage connecting its first orifice to its second orifice. The fluid exchanged with a tube fastened to the first orifice of the sleeve can thus flow via this internal passage to the second orifice of the coupling.

In the first position, a portion of the coupling is inside the sleeve.

Preferably, during step d), the coupling is moved in a direction such that an increasing portion of the coupling passes inside the sleeve. This makes it possible, once the sleeve has been fastened to the coupling, for the sleeve to be arranged around a large portion of the coupling, or indeed around the entire coupling, and possibly also a portion of the tube. This provision enables the sleeve optionally to perform various functions relative to the coupling (providing mechanical, thermal, etc. . . . protection).

The advantage of the structure of the connector with two portions that are fastened together is as follows.

This arrangement makes it possible to begin by fastening the tube to the coupling in step c) and then to fasten the sleeve to the coupling in step e).

As mentioned above, the coupling and the sleeve are two distinct parts designed to be capable of performing the relative movement of step d) between these two fastening steps.

In the first position, the first end of the coupling is outside the sleeve. Advantageously, in this position, it is easier to fasten the first tube to the coupling than it would be in the second position, where the end of the first tube is shifted relative to the first position. In the second position, the end of the tube may be in a position in which it is less easy or even impossible to fasten it to the first orifice of the coupling. An example of such a situation is when, in the second position, the first orifice lies inside the sleeve.

The method of the invention thus makes it possible to fasten the first tube to the coupling during a fastening step (step c)) by using a method of known reliability, and possibly to inspect the quality of the fastening during step c), prior to performing the movement specified in step d).

For example, in order to fasten the tube to the first orifice of the coupling, in one implementation, the end of the tube may be welded to the coupling, e.g. by orbital welding. Such welding may be performed in particular by a robot in a manner that is extremely reliable. Such welding can also be inspected.

Furthermore, in the assembly obtained in this way, the end of the first tube is fastened to the first end of the coupling, and the sleeve is fastened to any portion of the coupling.

As a result, the coupling may be of a shape that enables sleeves to be used presenting a very wide variety of shapes and/or lengths, and in particular that enables sleeves to be used that are very long (axially). Because of this, the length of the sleeve is advantageously not limited by the length of the first tube that can be made available inside the sleeve.

That said, in accordance with the invention, in step e) the sleeve is fastened to the coupling at a distance from the first orifice that is greater than the diameter of the internal passage of the coupling. The coupling thus acts as an extender for the first tube. Thus, the sleeve is not fastened to or in the vicinity of the end of the tube, but at a certain distance therefrom (i.e. the contacting portions of the sleeve and the coupling that are used for fastening them together, are remote from the first orifice of the coupling). Indeed, the distance between the zone where the sleeve is fastened to the coupling and the first orifice of the coupling is preferably greater than twice the diameter of the internal passage of the coupling.

Because of the distance between the zone where the sleeve is fastened to the coupling and the first orifice of the coupling, the stresses that are transmitted by the sleeve to the coupling are not localized within the coupling, but on the contrary they are relatively diffuse, thereby making it possible to limit stress concentrations in the vicinity of the first end of the coupling.

Furthermore, this distance enables the sleeve to extend over a certain length around the coupling (a length not less than the diameter of the inside passage of the coupling).

In a preferred implementation, the sleeve has a mechanical support function. The method then also includes a step f) in which the sleeve is fastened to a support. The support has a function of keeping the connector in position; by way of example, it may be constituted by a partition, a stand, etc.

In an implementation, step b) is performed as follows: the coupling is inserted into the sleeve via a second end of the sleeve situated at a side opposite from its first end and is then placed in the first position, thus enabling the tube to be fastened. Under such circumstances, the movements of the coupling in steps b) and d) take place in opposite directions: the coupling is inserted into the sleeve via the second end, and in step b) it is moved from the second end towards the first end of the sleeve; thereafter, in step d), the coupling is moved in the opposite direction towards the second end of the sleeve in order to enable the sleeve to be fastened to the coupling.

This mode of operation presents the following advantage.

Performing the fastening method leads to making a connector that unites the sleeve and the coupling.

When the above mode of operation is performed, only the first end of the coupling needs to pass through the first end of the sleeve. There is therefore no need for the opening in the sleeve at its first end to be considerably greater than the size of the first end of the coupling. Consequently, if the first end of the coupling is of small dimensions, and for example of substantially the same outside diameter as the first tube, then the first opening in the sleeve may be of a size close to that diameter (although slightly greater). This enables the first end of the sleeve to be almost completely blocked by the first tube itself once the fastening method has been completed. This enables the chamber or the passage inside the sleeve to be relatively isolated, in particular thermally isolated, from the outside environment situated in the vicinity of its first end. This thermal isolation can constitute thermal protection for the fastening between the end of the first tube and the coupling.

Conversely, no size limitation is involved on the second end of the coupling (the end at a side opposite from the first tube) or on the portion of the sleeve that is situated remote from the first tube.

Advantageously, this leaves great freedom for the shape of the portion of the coupling that is to be connected to the second tube, and for the portion of the sleeve that is to be fastened to the coupling.

In a second aspect, the invention also provides a connection kit comprising a sleeve and a coupling for connecting together at least one pair of tubes, wherein the coupling is generally tubular in shape, presenting an axis, together with first and second orifices for fastening the two tubes;

the first orifice is provided at a first end of the coupling and is oriented on its axis;

said first end is configured to enable one tube of said pair of tubes to be fastened in leaktight manner to the first orifice of the coupling;

the coupling is suitable for sliding coaxially relative to the sleeve, from a first position in which the first end of the coupling projects outside a first end of the sleeve; and to a second position that enables the sleeve to be fastened to the coupling at a distance from said first orifice, said distance being greater than the diameter of an internal passage of the coupling.

The fact that the sleeve is fastened to the coupling at the side opposite from the first orifice of the coupling means that the fastening or the connection between the sleeve and the coupling is at least at some minimum distance away from the first orifice of the coupling; this minimum distance is equal to the diameter of the internal passage of the coupling.

It can be understood that the connection kit as defined in this way enables a tube to be fastened to the coupling connected to the sleeve in order to form a connector, by using the above-defined fastening method; likewise, the method of the invention can be performed with any type of connection kit described in this document.

In the fastening kit, the sleeve may in particular provide a support function. Under such circumstances, in a preferred embodiment, the sleeve includes a base having a fastener flange for fastening the sleeve to a support. (The term "base" is used herein merely to designate a part that is used for, or that contributes to, fastening the connector to a structural part, relative to which the junction between the two tubes needs to be kept in position.)

In an embodiment, when the coupling is placed in the second position, the fastener flange is in the vicinity of the first end of the sleeve.

Furthermore, the coupling and the sleeve may be arranged in such a manner that once the first tube is fastened, the internal passage of the sleeve is thermally isolated in part, and if possible to a great extent, from the atmosphere outside the sleeve in the vicinity of its first end.

For this purpose, in an embodiment, the base partially closes the first end of the sleeve. The base thus presents a fluid flow section through the base that is smaller than the mean flow section of the sleeve (these sections being areas measured in section planes perpendicular to the axis of the sleeve).

The base may in particular be substantially plane and be oriented transversely relative to the axis of the sleeve. Under such conditions, it may for example serve to fasten the connector to a wall that the tube passes through, taking the place of a portion of the wall.

In an implementation including a base as specified above, a hole is made through the base for passing the tube, and the hole has a diameter that is slightly greater than the diameter of the internal passage of the coupling. A diameter is said to be "slightly greater than" herein when the diameter of the hole lies in particular in the range 1 to 1.5 times the diameter of the internal passage of the coupling.

In an embodiment, the sleeve presents a second end at a side opposite from the first end; and among the two ends of the sleeve, only the second end enables the coupling to be inserted into the sleeve in order to be positioned in the first position. This may be due in particular to the fact that the second end presents a flow area that is greater than that of the first end. This embodiment optionally makes it possible to use a coupling having a second end that is considerably larger than its first end.

This arrangement of the sleeve and of the coupling makes it possible to perform the specific mode of operation described above.

In an embodiment, the sleeve and the coupling are arranged in such a manner that the sleeve can be fastened to the second end of the coupling.

In an embodiment, relative to the axis of the coupling, when the coupling is placed in the second position, the first end of the coupling is inside the sleeve.

In an embodiment, the second orifice of the coupling is situated at a second end of the coupling, and is configured to enable a second tube of said pair of tubes to be fastened in leaktight manner to the second orifice of the coupling.

Finally, it should be observed that the invention includes a configuration in which the coupling has a plurality of internal passages, in particular parallel passages, for the purpose of passing a plurality of fluid streams. The coupling is then a coupling for connecting together a plurality of pairs of tubes. The various technical characteristics specified for the fastening method and the connection kit also cover such a configuration.

The invention can be well understood and its advantages appear better on reading the following detailed description of embodiments given as non-limiting examples. The invention refers to the accompanying drawings, in which.

Figure 1:
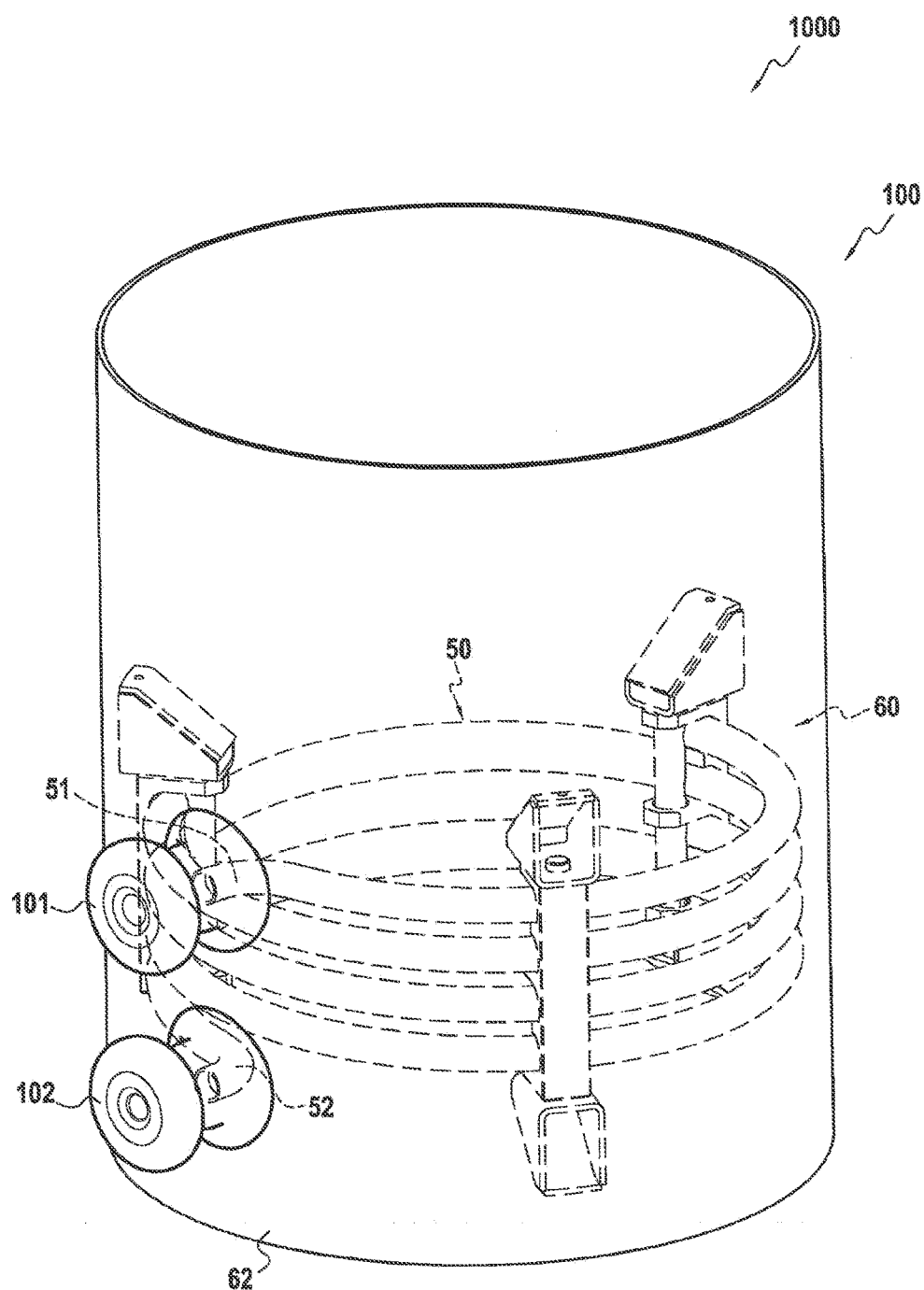
FIG. 1 is a diagrammatic perspective view of a heater including two assemblies of the invention.

The heater 100 shown in FIG. 1 forms part of a rocket engine 1000, of which only the heater is shown.

The heater 100 comprises a coil 50, a cylindrical tube 60, and two substantially identical connectors 101 and 102.

The tube 60 is a tube that passes the high-temperature exhaust gas from the engine 1000. The connectors 101 and 102 serve to hold the ends of the coil 50 at fixed positions relative to the wall of the tube 60. The coil is constituted by a helically-shaped pipe having four turns. The ends of the coil are bent to form right-angle bends 51 and 52 so as to be capable of passing through the wall 62 of the tube 60. By means of connectors 101 and 102, the coil 50 is connected respectively to an upstream portion and to a downstream portion (not shown) of the hydrogen delivery circuit.

When assembling the heater 100, the coil is placed initially inside the tube 60. Openings (including the opening 61 shown in FIG. 3) previously formed through the wall of the tube 60 enable the ends of the coil 50 to pass therethrough: once the coil is in place inside the tube 60, its ends are inserted into the two openings made through the wall 62.

Since the coil must avoid disturbing the passage of gas through the tube 60, the diameter of the coil is close to that of the tube 60, such that the turns of the coil are in the immediate proximity of the wall of the tube 60. Thus, the clearance or distance between the turns of the coil and the inside wall of the tube 60 is small, and it is not possible to make the ends of the coil project through the openings provided in the wall 62 by more than about 8% to 12% of the diameter of the tube 60 (i.e. 2 centimeters (cm) to 3 cm, where the diameter of the tube 60 is about 25 cm).

As mentioned above, because of the thermal expansions and contractions that affect the coil 50, and because of the acceleration and vibration to which the heater 100 is subjected, it is necessary to hold the coil 50 firmly in position relative to the tube 60. In particular, it is necessary to stress the ends of the coil 50 mechanically as little as possible in order to avoid any risk of cracking where the coil is connected to the upstream and downstream portions of the hydrogen delivery circuit.

For this purpose, and according to the invention, the coil is connected by means of connectors such as the connectors 101 and 102. By way of example, the connector 101 is described below with reference to FIGS. 2 and 3.

The connector 101 is made up of two parts that are assembled together: a sleeve 10 and a coupling 20 for connecting together at least one pair of tubes.

The coupling 20 is generally tubular in shape, constituting a body of revolution about an axis A. It presents an internal passage 22 extending along the axis A connecting together first and second orifices given respective references 24A and 24B. These orifices 24A and 24B are provided with counterbores for fastening tubes. In the assembly shown in FIG. 2, a first end 55 of the tube constituted by the coil 50 is connected to the first orifice 24A.

The orifices 24A and 24B are arranged at the ends 25A and 25B of the coupling; they are circular orifices coaxial about the axis A of the coupling. The orifice 24A in particular is designed to enable the end of a tube extending along the axis A to be fastened to the end 25A of the coupling.

Although certain embodiments of the invention may be symmetrical about a plane perpendicular to the axis A, in the embodiment shown, the coupling 20 is asymmetrical. It is constituted by combining two successive portions, referred to as the "cylindrical" portion 26A and the "frustoconical" portion 26B, given their general outside shapes. The internal passage 22 for its part is constant in diameter. The frustoconical shape of the portion 26B has the effect of increasing the outside diameter of the coupling in comparison to the cylindrical portion 26A, thereby enabling the second end 25B of the coupling to be mechanically reinforced compared with the first end. The end 25B of the coupling 20 terminates with a circular flange 28 to which the sleeve 10 is fastened.

The sleeve 10 is made up of three portions, namely a tubular shank 14, a bellows 16, and a base 12. These three portions are formed integrally. The base 12 thus constitutes the first end 10A of sleeve 10; conversely, the fraction of the bellows 16 that is remote from the base 12 constitutes the second end 10B of the sleeve.

The base 12 serves to fasten the connector 101 to the wall 62.

It is constituted by a disk pierced by a circular hole 13 in its center. This disk is for fastening in the opening 61 formed in the wall 62 in order to pass the end 55 of the coil 50.

The shank 14 and the bellows 16 perform a mechanical connection function between the base 12 and the coupling 20. The shank 14 is generally cylindrical in shape and of thickness that decrees progressively going from the base 12 to the bellows 16. This (progressive) reduction in thickness serves to provide a flexible portion 161, likewise of small thickness, in the fraction of the bellows that is adjacent to the shank.

The term "bellows" is used herein to mean a thin-walled part that extends around an axis and that has transverse dimensions that increase and then decrease.

The bellows 16 is thus constituted by the above-mentioned flexible fraction 161, of diameter that increases from the shank 14 towards the end 25B of the coupling, and a connection portion 162 of decreasing diameter that connects the flexible fraction to the flange 28. In order to enable the sleeve 10 to be fastened to the flange 28 by welding, the connection portion presents a circular hole 18 that is coaxial about the axis of the sleeve and that is of diameter D substantially equal to the outside diameter of the flange 28.

Figure 2:
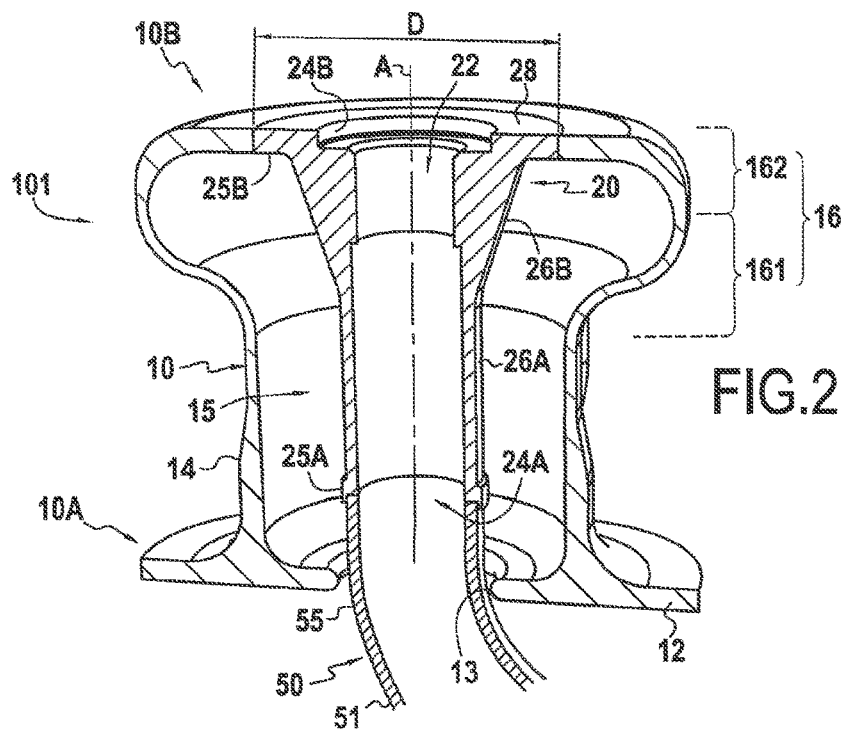
FIG. 2 is a section view of an assembly of the invention.

The flexible fraction 161 is of relatively small thickness, and its section presents a point of inflection (in a longitudinal section plane such as that of FIG. 2). For these reasons, the bellows 16, and more particularly its flexible fraction, presents a certain amount of resilience, making it possible to reduce the magnitude of the forces transmitted by the wall 62 to the end of the coil 50 as a result of the sleeve 10 deforming.

The sleeve 10 thus presents a larger-diameter portion constituted by the bellows 16, and a smaller-diameter portion constituted by the shank 14. The bellows 16 and the shank 14 are substantially adjacent axially along the axis A of the sleeve.

The sleeve 10 is thus mushroom-shaped. The changing diameter at the flexible fraction 161, which is of small thickness, enables the sleeve 10 to deform elastically along the axis A, thereby avoiding excessive stresses appearing in particular in the wells between the coil (or tube) 50 and the coupling 20.

Assembly

The connector 101 is assembled as follows. In order to allow the two ends of the coil 50 to pass through and be connected, the partition is provided with two large openings (including the opening 61 visible in FIG. 3), of diameter that is substantially equal to the outside diameter of the base 12.

The operations of assembling the connector 101 to the end 55 of the coil are as follows.

In an initial step, the end 55 of the coil is passed through the partition 62, via the opening 61.

a) The components of the connector 101 are then provided, i.e. the sleeve 10 and the coupling 20.

b) By means of a first movement, the coupling 20 is placed in such a manner that the first end 25A of the coupling projects outside the sleeve 10. The coupling 20 is then positioned relative to the sleeve 10 in the relative position shown in FIG. 3, referred to as the "first position".

Figure 3:
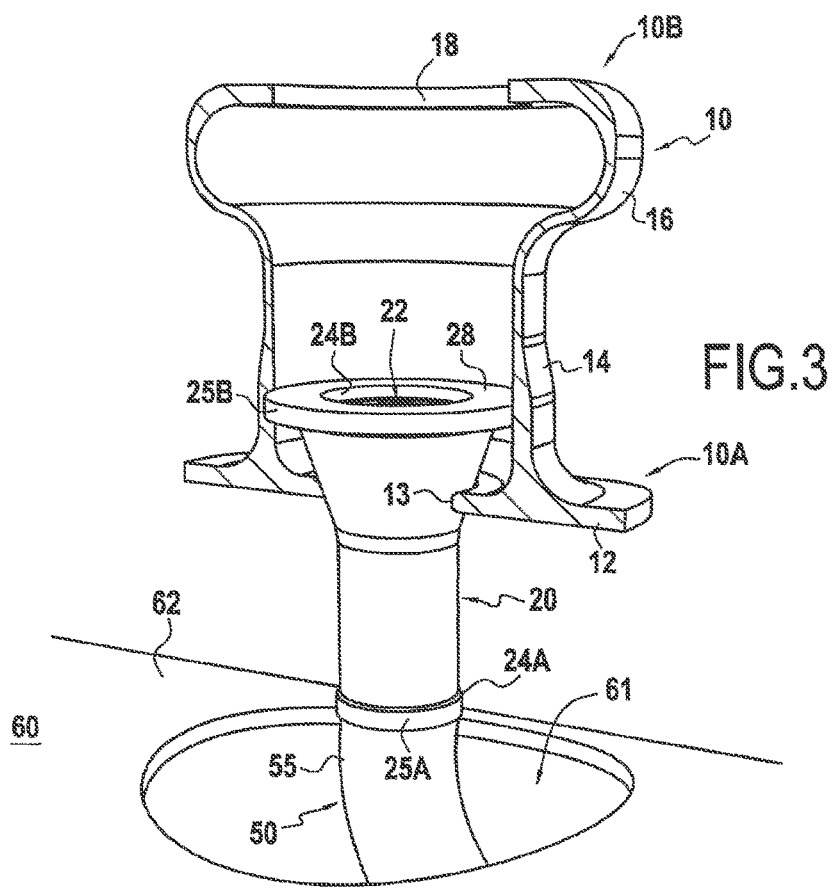
FIG. 3 is a section view of a connector of the invention while being fastened to a tube for constituting an assembly of the kind shown in FIG. 2.

This positioning is performed as follows: the coupling 20 is inserted into the sleeve 10, not via the hole 13, which is too small to pass the coupling 20, but via the hole 18, i.e. via the second end 10B of the sleeve 10. This operation is possible since the sleeve 10 and the coupling 20 are specially arranged to make it possible to cause the coupling 20 to enter into the sleeve 10 via the hole 18, and then to enable the coupling to slide inside the sleeve 10 until it occupies the first position, with its first end 25A projecting from the sleeve 10 via the end 10A for the purpose of fastening the tube. To enable the coupling 20 to move in this way inside the sleeve 10, it suffices in practice for the outside profile of the coupling 20 (which can be seen in FIG. 2) to be inside the inside profile of the sleeve 10 for all of the relative positions to be occupied by the coupling 20 relative to the sleeve 10, from the initial position of presenting the coupling 20 to the outside of the sleeve 10 in the vicinity of the hole 18, to the coupling being put into the "first" position relative to the sleeve 10 (FIG. 3).

In this first position, the first end 25A of the coupling 20 projects beyond the sleeve 10, thus enabling the end 55 of the coil to be fastened in secure and leaktight manner to the orifice 24A of the coupling.

c) The tube is then fastened to the first orifice. This operation is performed by orbital welding using a welding robot.

d) By means of a second movement, the coupling 20 is placed relative to the sleeve 10 in a second position in which the first orifice 24A of the coupling is inside the sleeve. This position is shown in FIG. 2.

e) While the coupling is in this second position relative to the sleeve, the sleeve 10 is fastened to the coupling 20 at a distance from said first orifice 24A. In the embodiment shown, this operation consists in welding the flange 28 in the hole 18.

f) Finally, the base 12 is fastened to the partition 62 by welding.

It can be understood that by appropriately selecting the length of the coupling 20 (measured along the axis A), it is possible to use a sleeve 10 of a length that matches the specifications that it needs to satisfy.

The use of an elongate coupling such as the coupling 20 thus makes it possible to remedy the limitations that arise because of the short length of coil 50 that is available outside the wall 60. The greater the length of the sleeve, the greater number of bellows it can include. By way of example, the sleeve may have a plurality of bellows instead of a single bellows such as the bellows 16. These bellows make it possible to increase the resilience of the sleeve and thus to limit the forces transmitted by the wall 62 on the end of the coil 50 even more than they are limited by the sleeve 10. In general manner, in order to give resilience to the sleeve, any shape, in particular the shape of a body of revolution, that presents an axial section that is not straight (e.g. that is S-shaped, etc.) facilitates axial deformation of the sleeve and makes it more resilient.

It should also be observed that the connector 101 as described is leaktight. This leaktightness is nevertheless not provided at the partition 62 (in the plane of the base 12, i.e. at the hole 13), but rather by the connector 101 as a whole. In order to obtain leaktightness for the connector 101, the end 55 is welded in leaktight manner to the orifice 24A of the coupling 20, the flange 28 is welded in leaktight manner in the hole 18, and the base 12 is welded in leaktight manner to the wall 62.

In contrast, since the hole 13 is not leaktight, the chamber 15 that is formed inside the sleeve 10, around the coupling 20 and the tube 55, is in connection with the inside of the tube 60 via a rather small annular passage surrounding the coil 50. Since this passage is small, the gas present inside the chamber 15 is renewed only slowly. It therefore performs a thermal damping function in the connectors 101 and 102 between the gas flowing in the tube 60 and the hydrogen flowing in the coil. The gas contained in the chamber 15 adopts a temperature that is intermediate between the temperature of the hydrogen flowing in the coil 50 and the temperature of the exhaust gas flowing in the tube 60. By means of this, the weld formed at the end 55 of the coil in the connector 101 is thermally protected against harmful thermal effects that would otherwise occur if the weld were raised to the high temperature of the exhaust gas from the engine 1000.

The invention claimed is:

1. A connection kit comprising a sleeve and a coupling for connecting together at least one pair of tubes, wherein
   the coupling is generally tubular in shape, presenting an axis, together with first and second orifices for fastening the two tubes;
   the first orifice is provided at a first end of the coupling and is oriented on its axis;
   said first end is configured to enable one tube of said pair of tubes to be fastened in leaktight manner to the first orifice of the coupling;
   the coupling is suitable for sliding coaxially relative to the sleeve, from a first position in which the first end of the coupling projects outside a first end of the sleeve;
   to a second position that enables the sleeve to be fastened to the coupling at a distance from said first orifice, said distance being greater than a diameter of an internal passage of the coupling.

2. A kit according to claim 1, wherein the sleeve-includes a base having a fastener flange for fastening the sleeve to a support.

3. A kit according to claim 2, wherein the base partially closes the first end of the sleeve.

4. A kit according to claim 2, wherein the base is substantially plane and oriented transversely relative to an axis of the sleeve.

5. A kit according to claim 2, wherein a hole provided in the base for passing a tube presents a diameter that is slightly greater than the diameter of the internal passage of the coupling.

6. A kit according to claim 2, wherein, when the coupling is placed in the second position, the fastener flange is in the vicinity of the first end of the sleeve.

7. A kit according to claim 1, wherein the sleeve presents a second end at a side opposite from the first end and
   among the two ends of the sleeve, only the second end enables the coupling to be inserted into the sleeve in order to be positioned in the first position.

8. A kit according to claim 1, wherein, relative to an axis of the coupling, when the coupling is placed in the second position, the first end of the coupling is inside the sleeve.

9. A kit according to claim 1, wherein the second orifice of the coupling is situated at a second end of the coupling, and is configured to enable a tube of said pair of tubes to be fastened in leaktight manner to the second orifice of the coupling.

10. A fastening method for fastening a tube to a connector, the method comprising the following steps:
   a) providing a connection kit according to claim 1;
   b) placing the coupling in a first position in which the first end of the coupling projects outside the sleeve through a first end thereof;

c) then fastening the first tube in leaktight manner to the first orifice of the coupling;

d) moving the coupling relative to the sleeve into a second position in which the first orifice preferably lies inside the sleeve; and e) with the coupling in the second position, fastening the sleeve to the coupling at a distance from said first orifice, said distance being greater than a diameter of an internal passage of the coupling, the sleeve and the coupling together constituting a connector.

11. A fastening method according to claim 10, wherein, in step c), the end of the first tube is welded to the coupling.

12. A fastening method according to claim 10, wherein, in step b), the coupling is inserted into the sleeve via a second end of the sleeve situated at a side opposite from its first end, and is then placed in said first position.

13. A fastening method according to claim 10, further including a step f) in which the sleeve is fastened to a support.

14. A fastening method according to claim 10, wherein, in step c), the end of the first tube is welded to the coupling by orbital welding.

\* \* \* \* \*